Patented Mar. 9, 1943

2,313,441

UNITED STATES PATENT OFFICE 2,313,441

NITRATED LIGNOCELLULOSE

Edwin Cornelius Jahn and Sydney Coppick, Syracuse, N. Y.

No Drawing. Application March 25, 1940, Serial No. 325,926

2 Claims. (Cl. 260—220)

This invention relates to the production and utilization of nitrated ligno-cellulose, and relates more particularly to the nitration of natural or partially esterified or etherified ligno-cellulosic materials under such controlled conditions as to produce a high yield of nitrated ligno-cellulose which is wholly or substantially wholly soluble in acetone and certain other common solvents and which is suitable for conversion into or utilization in various useful forms such as plastics, films, lacquers, filaments and laminated materials.

The nitration of pine wood is described by Hermann Friese and Hans Furst (Berichte der Deut. Chem. Gesel., vol. 70B, 1463–1473, 1937) in connection with their studies on the cleavage of wood into its constituents. It is to be noted that these workers employed a fuming nitric acid (sp. gr. 1.52) and mixed this with concentrated sulfuric acid (sp. gr. 1.84) or other anhydrous acids. This nitrating mixture was allowed to act on dry, acetone-extracted, pine wood meal; hence anhydrous or very nearly anhydrous conditions were maintained. The reaction was carried out at room temperature or slightly under (18–20° C.). Their product is described as being soluble in acetone to the extent of about 6 per cent. With the specific acids mentioned above, these experimenters obtained a yield of only about 55 per cent based on the extracted wood meal, and considerable degradation of the wood substance occurred during the nitration.

According to our invention, on the other hand, the ligno-cellulosic material to be treated is preferably in ordinary air-dry condition, containing up to 10 per cent water; the nitrating liquor preferably comprises a mixture of commercial concentrated nitric and sulfuric acids containing a substantial amount of water; and, during the mixing of the nitrating liquor with the ligno-cellulose, the temperature is kept below 18° C. and preferably at 10–12° C. The nitrated ligno-cellulose obtained under these conditions is soluble in acetone to the extent of 90 per cent or more, sometimes even being completely soluble, and this solubility permits its utilization in a practical and convenient manner in the various ways already mentioned. With our process of nitration, the yield of dry product based on the original ligno-cellulosic material, oven-dry basis) is usually 105 to 140 per cent, and may be as high as 185 per cent.

We have successfully applied our process of nitration to natural ligno-cellulosic materials such as wood, straw and bagasse, and also to such ligno-cellulosic materials from which portions of the lignin or of the cellulose or of other constituents have been removed, for example by hydrolysis or partial digestion. It is evident that any wood or lignified tissue or partially esterified or etherified ligno-cellulosic material may be satisfactorily nitrated in accordance with our invention to produce a nitrated ligno-cellulose which is wholly or nearly entirely soluble in acetone and certain other common organic solvents. The following ligno-cellulosic materials have been treated by us in accordance with the present invention, yielding in each case a nitrated ligno-cellulose more than 90 per cent soluble in acetone and very suitable for the forming of clear films and plastics:

Eastern spruce sifted sawdust
Eastern spruce mechanical pulp
Southern pine sifted sawdust
Douglas fir sifted sawdust
Eastern white pine mechanical pulp, 27.2% lignin
Eastern white pine, partially cooked sulfate pulp, 23.74% lignin
Eastern white pine, partially cooked sulfate pulp, 16.63% lignin
Eastern white pine, partially cooked sulfate pulp, 6.29% lignin
Western white pine sifted sawdust
Aspen sifted sawdust
Beech sifted sawdust
Fire cherry sifted sawdust
Red gum sifted sawdust
Wheat straw, ground
Bagasse, ground
Bagasse, ground and mildly digested with dilute caustic soda solution The ligno-cellulosic material to be treated in accordance with our invention is brought into a moderately finely divided state. It may be in the form of sifted sawdust (about 40 mesh or finer), thin planer shavings, powder (finely divided ground material such as wood flour), fibrous masses (such as ground wood pulp, shredded straw or shredded bagasse) or sheets of fibers. The material in any of the above forms may be treated in the air-dry condition or dryer, and may contain from 10 per cent to zero per cent water.

The nitrating liquor, according to our invention, is preferably composed of commercial concentrated nitric acid (sp. gr. 1.41–1.42) and commercial concentrated sulfuric acid (sp. gr. 1.82–1.84). The ratio of nitric acid to sulfuric acid may vary widely. A suitable mixture contains one part by weight of 68–70 per cent nitric acid to three parts by weight of 94–96 per cent sulfuric acid. The nitric and sulfuric acids may be used in any concentrations which will provide a mixture containing 17 to 18 parts $HNO_3$, 70 to 72 parts $H_2SO_4$, and 10 to 13 parts of water, by weight. In place of the sulfuric acid other acids such as phosphoric acid, glacial acetic acid, or acetic anhydride may be used.

The nitrating liquor is first cooled, preferably to a temperature of 12° C. to zero degrees C., and then the ligno-cellulosic material in any of the forms described above is directly incorporated into the nitrating liquor, the ligno-cellulosic material being added at such a rate, while stirring, that no substantial temperature rise occurs. Conversely, the cooled nitrating liquor may be rapidly poured on or pumped up through the ligno-cellulosic material by any method which provides rapid intimate contact of the nitrating liquor with all the material. While the material is being impregnated with the nitrating liquor, the mixture is kept cool, preferably at 12° C. or below, by any suitable means, such as a cold water jacket.

The relative quantities of nitrating liquor and ligno-cellulosic material employed will depend upon the physical state of the material, its moisture content, and the manner of impregnating and mixing the material with the liquor. The amount of liquor must be such that the material is rapidly and completely impregnated with considerable free liquor remaining, so that the mass action of the cooled liquor will prevent any localized overheating.

After the impregnation of the material with the liquor is completed, the mixture may be kept at the impregnation temperature (12° to zero degrees C.), or may be allowed to rise to any temperature up to room temperature (20° to 30° C.). In either case, the mixture is allowed to stand for a sufficient time to complete the nitration to the desired extent. The length of time of nitrating depends upon a number of factors, such as the state of division of the material, its moisture content, the temperature of nitration, and the properties of the product desired. One half hour to 75 hours will give a suitable product under appropriate conditions. The more desirable times of nitration appear to be between 1 and 6 hours. The excess free liquor may be allowed to remain in the mixture during the entire nitrating period or, if desired, the excess free liquor may be drained off at the end of the impregnating step and the nitration of the material allowed to proceed in the soaked condition.

At the end of the nitration period the excess acid may be removed by squeezing, sucking, draining or siphoning. The nitrated mass is then incorporated into a large excess of cold water, preferably at a temperature of 10 to 15° C., or is flushed with large amounts of water at such temperature.

After the free acid has thus been washed out, the nitrated material is dried preferably at temperatures between room temperature and 65° C., although temperatures as high as 100° C. may be employed. The nitrated ligno-cellulosic material retains its original particle shape and appearance. If the material thus treated is in a fibrous condition, it may be handled as a pulp, formed into sheets, and the sheets dried in either a continuous or intermittent operation by passing them through a warm chamber, a vacuum chamber, or over heated rolls or plates. If in a granular or powdered form, the nitrated ligno-cellulosic material may be dried by any of the conventional methods used in handling such materials.

The excess acid removed at any stage of the foregoing process may be fortified with fresh acids and used in further nitration operations.

The yield of dry nitrated ligno-cellulose depends upon the nitrating conditions and the character of the original ligno-cellulosic material. In all of the cases described above, the yield of oven-dry product based on the oven-dry original ligno-cellulosic material is well over 100 per cent, being usually 105 to 140 per cent and may be as high as 185 per cent. The yield and the solubility of the product in acetone depend greatly upon the nitrating conditions, particularly the ratio of water and acids, and the time and temperature, and also upon the character of the original ligno-cellulosic material and its state of subdivision. In all of the cases mentioned above, the product was wholly or nearly wholly soluble (90 per cent or more) in acetone. Small amounts of acetone cause the product to swell, and then coalesce into a homogeneous clear, transparent viscous paste. Upon evaporation of the acetone, a hard, clear, transparent film or mass is left. Most of the product may be precipitated from its acetone solution by water. If the product is permitted to swell in small amounts of acetone, it may be taken up in a large number of organic solvents, such as nitromethane, dioxane, diacetone alcohol, methyl alcohol, ethyl alcohol, butyl cellusolve, and ethyl acetate.

The air dried nitrated ligno-cellulose contains 9.5 to 11.5 per cent of nitrate nitrogen, depending upon the material and the conditions. The dry product is rapidly combustible and is yellowish or orange in color. As stated above, the dry product has the particle shape and appearance of the original ligno-cellulosic material.

The nitrated ligno-cellulose will swell without the acetone treatment in a number of organic solvents, and, depending upon nitrating conditions, will wholly or nearly wholly dissolve in some, such as nitromethane and methyl alcohol.

The small amount of acetone-insoluble material may be removed from an acetone solution of the product, if desired, by pressure filtration or by centrifuging, leaving a perfectly clear solution. The insoluble fraction is in a swollen condition and upon drying coalesces to a uniform hard mass or film. For most uses any acetone-insoluble material may be left suspended in the solution, or may remain mixed with the acetone swollen mass.

The nitrated ligno-cellulose when thoroughly washed and free of contamination is stable under all normal use, working and processing conditions. Heating at 105° C. causes no change other than a slight deepening of color. Hot water extraction enhances its stability.

The following is a specific example of the nitration of a ligno-cellulose in accordance with our invention:

*Example*

Air dry eastern spruce wood was ground and sieved to 60–80 mesh. A nitrating liquor was prepared by mixing 125 parts by weight of commercial nitric acid (sp. gr. 1.415–1.42, 30–32% water) and 375 parts by weight of commercial sulfuric acid (sp. gr 1.84, 3.5–4.5% water), and was cooled to 10° C. This nitrating liquor was then poured with stirring on 10 parts by weight of the ground spruce wood so that the final ratio of wood to mixed acid was 1 part to 50 parts. The mixture was kept at 10° C. for 5 hours. The excess acid was then filtered off by suction, and the acid-wet product incorporated into 400 parts by weight of water at 10° C. per 10 parts by weight of the original wood. The water was removed by filtration, and the nitrated wood washed with cold water at 10° C. until free of acid. The product was then air-dried. The yield of nitrated ligno-cellulose (oven-dry basis) was 123%. The product was 94.5% soluble in acetone and contained 10.3% of ester nitrogen.

*Utilization of the nitrated ligno-cellulose*

Nitrated ligno-cellulose prepared in accordance with the present invention lends itself readily to plastic molding and the formation of plastic products. The air-dried product may be dampened with acetone, mixtures of acetone and other solvents, or with other swelling solvents as described above, and then formed into molded articles. Where excess solvent is present during molding, this may be removed by air seasoning after molding, and then again molding, if necessary, to reshape the article. The molded articles may be formed in a number of ways, of which the following are illustrative:

1. The acetone or other solvent dampened material may be kneaded or mixed until homogeneous and the crumbs cold molded to any shape under pressure.
2. The acetone or other solvent dampened material may be mixed with a plasticizer, such as camphor, and then cold or hot molded. When mixed with suitable plasticizers the product is thermoplastic.
3. Where the nitrated product is fibrous, it may be formed into sheets prior to drying, as described above. These sheets when dampened with acetone or other swelling solvents may then be pressed together to form homogeneous plates or blocks. Plasticizers may be incorporated by dissolving them in the swelling agent.
4. The swollen crumbs or sheets prepared as above described may be hot or cold molded by static pressure in molds or between plates, or by rolling between rollers.
5. Thick sheets, panels and blocks may be built up by compressing together cast films, or previously formed sheets or blocks, the surfaces of which are first dampened with a swelling agent.
6. The product according to this invention may be mixed with and molded together with other plastic materials or resins which swell in the same solvents or which will fuse together therewith (such as pyroxylin, cellulose acetate, various synthetic and natural resins) or with inert fillers (such as wood flour or pulp, asbestos and mica), or with suitable dyes.

Films of nitrated ligno-cellulose may be readily formed by dissolving the product in acetone or other suitable solvent and casting by a suitable casting device, or by ejecting through slits. Various other materials may be incorporated into the film by dissolving them in the solution prior to casting or ejecting the film. Where films are to be made it is preferable first to remove the acetone insoluble fraction of the product as described above.

Filaments may be prepared in a manner analogous to the preparation of films by ejecting the solution of the product through fine openings into a drying atmosphere or a precipitating medium.

Solutions of the nitrated ligno-cellulose may be spread on various surfaces, such as wood, stone, glass and metal, where it forms a smooth, tight lacquer coating. The properties of this lacquer may be modified by adding appropriate substances to the solution prior to spreading.

Laminated products of a variety of forms and properties may be prepared by coating paper sheets, cardboard, canvas and other textiles, by dipping or otherwise, with a solution of nitrated ligno-cellulose, and then compressing the sheets together.

The product of this invention when in a thin form such as films and filaments may be effectively denitrated by treatment with a solution of ammonium sulfide or other denitrating agent. Thicker products may be denitrated at the surface by the same procedure. Such treatment effectively decreases the inflammability of the product.

The inflammability of products made in accordance with this invention may also be decreased by incorporating with the nitrated ligno-cellulose prior to molding, casting or the like, a fire resistant substance such as cellulose acetate, or fillers such as asbestos or mica, or by coating the product with a thin layer of cellulose acetate or other fire resistant compatible substance.

The nitrated ligno-cellulose may be bleached by means of chlorine dioxide, hypochlorites, and similar bleaching agents. This bleaching operation may be performed on the nitrated ligno-cellulose either in the finished dry state or in the wet condition after washing out the free acid. The nitrated ligno-cellulose is suspended in an aqueous solution of the bleaching agent for a sufficient time to oxidize the dark-colored constituents, after which the bleaching agent solution is removed and the product washed with water, thereby leaching out impurities. The bleached product thus obtained will have a white color in the fibrous or particle state, and may then be worked as described above to form colorless plastics, films or filaments. The bleached material thus formed is essentially nitro-cellulose, and is similar to the pyroxylin of commerce.

Although we have thus described our invention in considerable detail, it will be apparent that changes may be made by those skilled in the art without departing from the spirit of our invention, and we desire to be limited, therefore, only by the scope of the appended claims.

We claim:

1. The process of nitrating finely divided ligno-cellulosic material containing a substantial proportion of lignin of the order of at least 6.29%, which comprises cooling an acid nitrating liquor containing a substantial amount of water typified by 10 to 13 parts of water by weight to 100 parts of acid nitrating liquor to a temperature range between 18° C. and substantially 0° C., mixing said nitrating liquor and the ligno-cellulosic material, said nitrating liquor being in substantial excess of the amount necessary to saturate the ligno-cellulosic material therewith, maintaining said mixture at a temperature range between 18° C. and substantially 0° C. until the ligno-cellulosic material is completely impregnated with the acid nitrating liquor, maintaining said impregnated material at a temperature between 30° C. and approximately 0° C. until the nitration is complete, then removing the residual acid nitrating liquor from said material and finally drying said material.

2. The process of nitrating finely divided ligno-cellullosic material containing a substantial proportion of lignin of the order of at least 6.29% which comprises cooling an acid nitrating liquor comprising a mixture containing 17 to 18 parts of nitric acid, 70 to 72 parts of sulfuric acid and 10 to 13 parts of water to a temperature range between 10° C. and 12° C., mixing said nitrating liquor and the ligno-cellulosic material, said nitrating liquor being in substantial excess of the amount necessary to saturate the ligno-cellulosic material therewith, maintaining said mixture between 10° C. and 12° C. until the ligno-cellulosic material is completely impregnated, maintaining said impregnated material at a temperature range between 30° C. and approximately 0° C. until the nitration of the ligno-cellulosic material is complete and said material contains 9½ to 11½% of nitrate nitrogen when dried, removing the residual acid nitrating liquor from said material and finally drying said material.

EDWIN CORNELIUS JAHN.
SYDNEY COPPICK.